Sept. 28, 1965   J. W. CHANNELL ET AL   3,209,067
SEALED SPLICE ENCLOSURE FOR CABLES
Filed Aug. 21, 1961   3 Sheets-Sheet 3

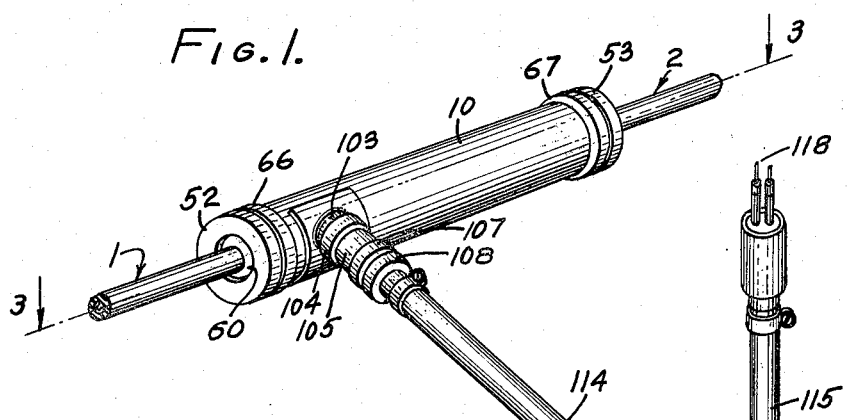

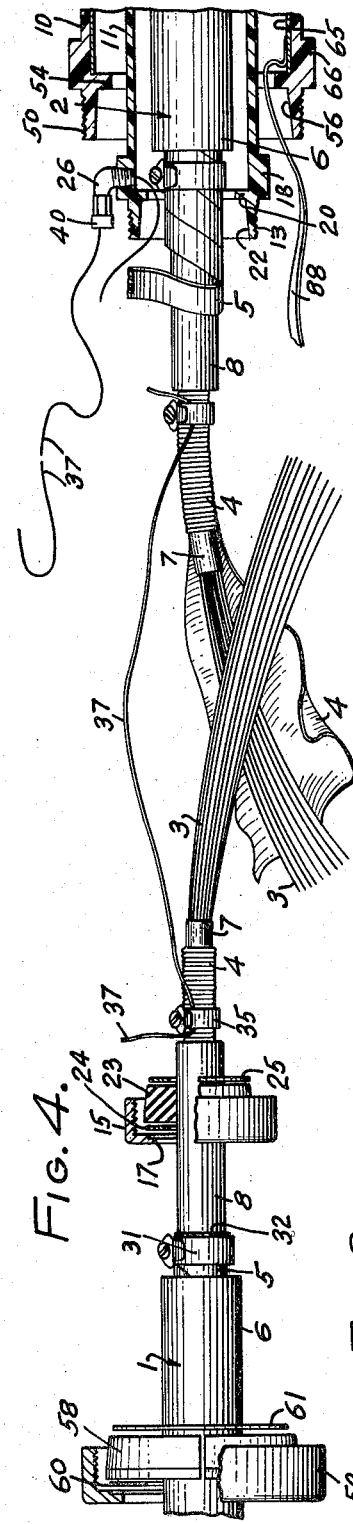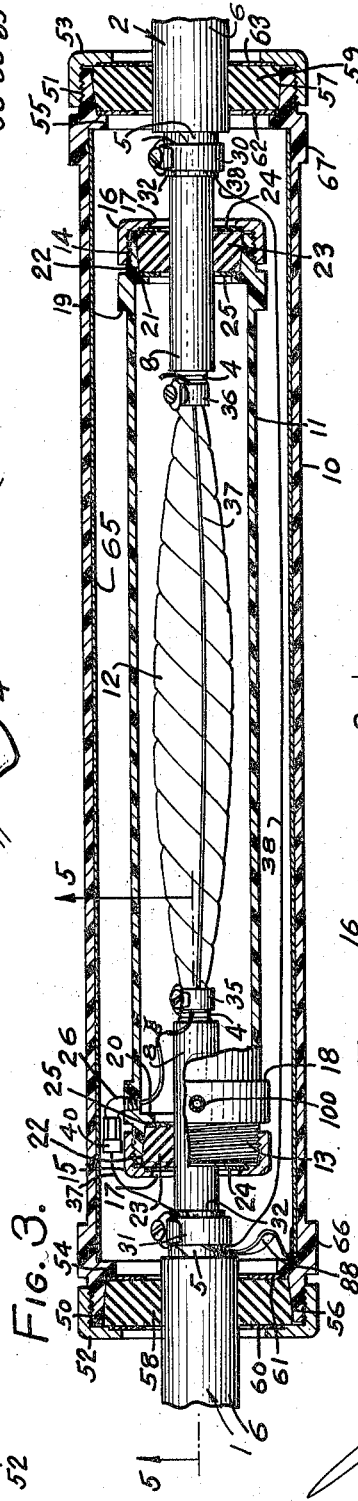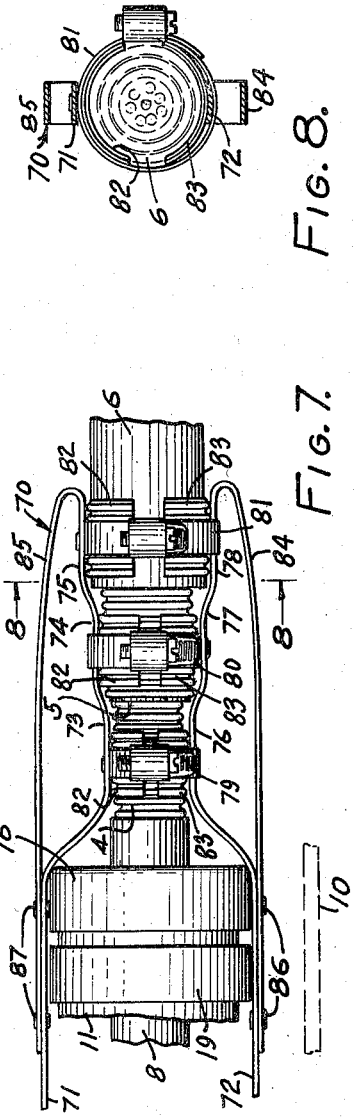

WILLIAM H. CHANNELL,
JAMES W. CHANNELL,
INVENTORS.

BY
Calvin Brown
ATTORNEY

United States Patent Office 3,209,067
Patented Sept. 28, 1965

3,209,067
SEALED SPLICE ENCLOSURE FOR CABLES
James W. Channell, Dana Strand Club, Box 117, Dana Point, Calif., and William H. Channell, 122 Oak Tree Drive, Glendora, Calif.
Filed Aug. 21, 1961, Ser. No. 132,954
7 Claims. (Cl. 174—93)

The present invention relates to a splice enclosure for cables, particularly of the double or triple sheath type. The invention contemplates a double splice enclosure adaptable to have the inner sheath pressurized with a gas.

The present invention functions efficiently for missile jobs where the utmost protection for the cable splice is required.

It is customary to provide cable splices every four or five hundred feet in underground duct runs, 1500' to 3000' in buried runs and to provide an alarm system to indicate any failure of a splice, any hole or damage to a cable at a splice point actuates an alarm. However, the alarm system is usually at a central station which may include several splice points and the repair man may take readings at the different splice points to determine the lowest pressure reading which will indicate the splice that has failed, whereupon repair may be made.

Splices which are buried within the ground often fail due to rodents eating into the sheath which surrounds the cable. The present invention is so constructed and arranged that the cable at its splice point is at all times protected against rodents.

An object of the invention is the provision of a splice enclosure for cable which prevents radiation from penetrating the enclosure.

A further object is the provision of a splice enclosure which will withstand heavy pressure resultant from heavy objects riding over the enclosure or from the effects of explosions such as would occur during war time.

A further object is the provision of a splice enclosure for cable which will not rust or corrode when buried in the ground.

A further object is the provision of a splice enclosure for cables so constructed and arranged as to provide for testing the splice at ground level without the necessity of digging to the splice enclosure when the splice enclosure is laid in the ground.

A further object is to provide a splice enclosure for cables wherein the cable at the splice is stabilized so as to withstand lateral and longitudinal stresses.

A further object is the provision of a splice enclosure for cables wherein the enclosure is impervious to electrolysis.

A further object is the provision of a splice enclosure wherein a splice is maintained under gas pressure with means whereby an operator may test the pressure within the splice enclosure at ground level with a simple air pump.

A further object is the provision of a splice enclosure for cables wherein the splice enclosure may be used in various locations and adaptations such as for direct burial, aerial, manhole and central office vaults, while affording desired strength and protection to the splice and the pressurized areas of the cable.

Other objects and advantages of the invention will appear from the description of the invention.

In the drawings:

FIGURE 1 is a fragmentary perspective view of a splice enclosure of the invention with cable extending from the enclosure with means for testing gas pressure at a splice;

FIGURE 2 is a fragmentary, partially sectional view, illustrating the splice enclosure of the invention buried within the ground with leads from said splice enclosure to the surface of the ground for testing pressure within the enclosure;

FIGURE 3 is a fragmentary, longtiudinal sectional view, on an enlarged scale, and taken on the line 3—3 of FIGURE 1;

FIGURE 4 is a fragmentary, partially sectional detached view showing sequence of parts used in the forming of a cable splice for use in the splice enclosure of the invention;

FIGURE 5 is a fragmentary enlarged sectional view on the line 5—5 of FIGURE 3;

FIGURE 6 is an enlarged sectional view of a fitting used in the invention;

FIGURE 7 is a fragmentary plan view showing a cable torque stabilizer and longitudinal stress bar utilized for securing ends of the cable;

FIGURE 8 is a sectional view on the line 8—8 of FIGURE 7;

Figure 9:
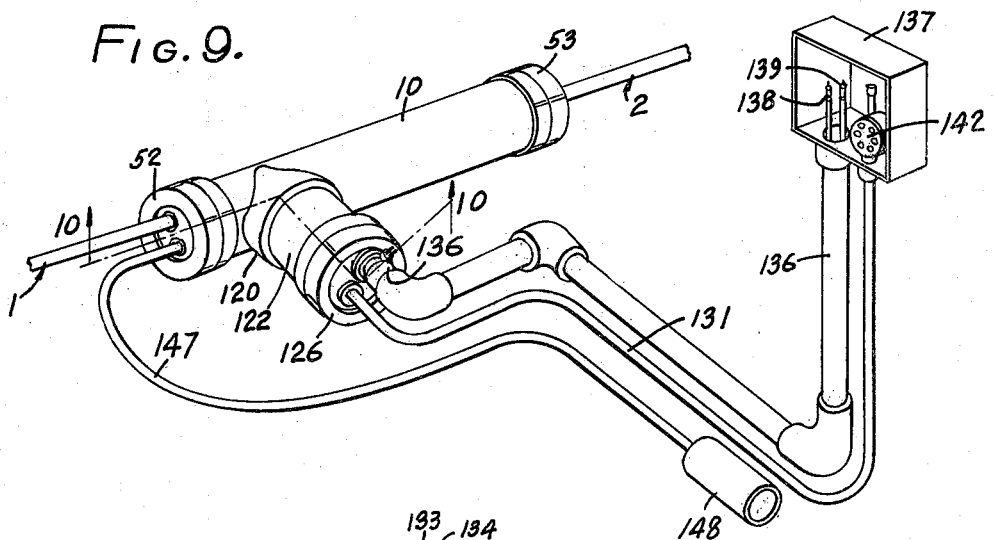
FIGURE 9 is a fragmentary, perspective view showing means for testing pressure within the cable splice enclosure.

Referring now to the drawings, our invention is shown in connection with double sheath armored cable and is for the purpose of dual sealing the same utilizing outer and inner sleeves of particular construction. We also refer to the sleeves as enclosures for the cable splice. As will hereinafter appear, branch splices may be accommodated in the present invention.

Reference is made to FIGURE 4 of the drawings which shows two cables, 1 and 2, the wires of which are to be joined together to form what is called a splice. In the present instance, both cables are of identical construction and of the dual sheath type wherein for one cable end the wires 3 project from a corrugated shield 4, usually the shield 4 being of aluminum and surrounding the corrugated shield 4 is a steel armored tape 5. Surrounding the armored tape is an outer sheath 6. Generally speaking the cable of the type shown has a rubber or plastic sheath 7 between the wires 3 and the corrugated shield 4, with a further rubber or plastic sheath at 8 between the corrugated shield 4 and the steel armored tape 5. The sheath 6 is applied directly around the steel armored tape 5. Thus the cable and particularly the wires 3 are afforded considerable protection from elements and other destructive forces.

To protect a splice after it has been formed by joining the wires of the two ends of the cables 1 and 2, the splice portion and a portion of the cables is further protected by means of outer and inner sleeves 10 and 11 respectively and in the manner shown in FIGURE 3. The inner sleeve 11 is of sufficient diameter and length to accommodate the taped splice 12 after the splice has been completed. Thus upon reference to FIGURE 4, the inner sleeve 11 is externally screw threaded at each end 13 and 14 to receive interiorally threaded caps 15 and 16, the top of each cap provided with an axial bore 17, the bore diameter being greater than the external dimensions of the cables provided with the steel armored tape. Both ends of the sleeve 11 inward from the threaded ends is externally provided with annular shoulders or flanges 18 and 19 which may be provided with enlarged flutes or transverse ribs, not illustrated, to permit gripping of the sleeve to apply the end caps thereto. Each end of the sleeve is provided with an internal annular shoulder 20 and 21, the diameter of the opening in said annular shoulders being substantially equal to the diameter of the openings 17 in the caps 15 and 16. The inner wall at each end of the shell of the sleeve is tapered outwardly from the shoulders 20 and 21, as shown at both ends at 22. This provides what we may term a tapered socket. Each end of the sleeve 11 is adapted to receive a grommet, of like construction, and designated for both grommets as 23. Preferably the grommets are split. The grommets are formed from a synthetic rubber such as polychloroprene, commonly known in the trade as neoprene. Split washers 24 and 25 are provided for each face of a grommet, one washer 25 fitting against the shoulders 20 and 21 while the opposite washers 24 are engaged by a cap. It will be observed that the shoulder or flange 18 carries an angular fitting 26. One end of the fitting is screw threaded in a threaded bore in said shoulder or flange 18 and has communication with the interior of the sleeve 11 while the opposite end of said fitting is exterior the sleeve.

FIGURE 4 detatils steps for the assembly of the splice 12. Thus clamps 30 and 31 surround and engage the steel armored tape 5, the armored tape being removed forwardly of the clamp, as shown in FIGURE 3 at 32 for each cable end. A cap, together with two washers and a grommet therebetween, are carried on the sheath 8 of one cable while the sleeve 11 with a cap, grommet and washers, are carried on the outer sheath 6 of the other cable. This is shown in FIGURE 4. A pair of clamps 35 and 36 are secured around the corrugated shields 4 for each cable and after the splice has been made and taped, as shown at 12, a wire 37 connects the two clamps 35 and 36 and the sleeve 11 is moved from the position shown in FIGURE 4 over the taped splice 12 for connection with the cap shown on one cable length. When the caps are tightened upon the screw-threaded ends 13 and 14 of the sleeve 11, the grommets are compressed between the washers and the cable sheaths 8 are tightly gripped by the grommets so that the interior of the sleeve 11 is air tight. This is very important in the practice of the present invention. The bonding wire 37, as shown in FIGURE 3, is extended through the fitting 26 and outwardly thereof for connection with the clamp 31, which bonding wire extends between the clamps 30 and 31 for each end of the two cables, as shown at 38. Wire 37 is passed through the fitting 26 in the manner shown in FIGURE 6 wherein the fitting carries a screw-threaded end cap 40, the fitting being provided with a grommet 41 through which the wire is passed and through a central opening in the cap 40. This construction provides an air seal.

The outer sleeve 10 has greater length and diameter than that of the inner sleeve so as to readily accommodate the inner sleeve therein. The outer sleeve follows the construction of the inner sleeve in that both ends are externally screw threaded at 50 and 51 to receive internally threaded caps 52 and 53, the sleeve being internally provided with annular shoulders 54 and 55 with ends internally provided with tapered walls which lead to the shoulders 54 and 55, as shown at 56 and 57. The tapered walls form sockets for the reception of split grommets 58 and 59 with washers 60, 61, 62 and 63, on both sides of the grommets. The washers and grommets are fitted within the sockets and the caps 52 and 53 are secured to the threads for the purpose of compressing the grommets around the cable sheath for both cables 1 and 2 and particularly the sheaths 6. The same procedure used in installing the inner sleeve about the cable splice is followed for the outer sleeve, as illustrated in FIGURE 4. The outer sleeve 10 is internally provided with a steel tube liner 65 for the purpose of resisting compressive forces. Both the outer and inner sleeves 10 and 11 are preferably formed from a polyvinyl chloride. This type of plastic is used for water pipes and has great strength and is not subject to corrosion. The outer sleeve 10 is provided also with external end flanges or shoulders 66 and 67 to permit the holding of the sleeve while the caps are rotated.

It is essential that the completed splice is not subjected to tensile stress. Accordingly, we have provided what we term a cable torque stabilizer and longitudinal stress bar means 70. This stress means 70 interconnects two cable ends. Thus, referring to FIGURES 7 and 8, the means 70 includes two substantially parallel straps or bars 71 and 72 arranged in diametric relationship relative to the sleeve 11. The straps 71 and 72 each have a longitudinal portion which extends the length of the sleeve 11 and which straps are bent inwardly at each end towards the cable sheaths, as shown at 73, 74 and 75 for one strap and 76, 77, and 78 for the opposite strap. The portions 73 and 76 secure therebetween worm gear clamp 79 while the portions 74 and 77, as well as the portions 75 and 78 secure therebetween worm gear clamps 80 and 81. The worm gear clamps are of different diameters. Each worm gear clamp carries a pair of corrugated curved shoes designated generally for all of the clamps as 82 and 83. The shoes are corrugated as shown in FIGURE 7 and the shoes for clamp 79 engage the corrugated shield 4 for the cable while the corrugated shoes for clamp 80 engages a corrugated sheath or shield carried over the armored tape 5 while the corrugated shoes for clamp 81 engages the sheath 6 for one of the cables. We have described but one side of the device and the straps 71 and 72, as stated, extend the length of the inner shield with the opposite end of said straps identically formed with the ends shown in FIGURE 7. Both straps beyond the worm gear clamp 81 for each end is bent backwardly, as shown at 84 and 85 and secured to the straps 71 and 72 by riveting or welding, as shown at 86 and 87. Thus in the construction shown, when the worm gear clamps tightly engage the cable sheaths for both cables relative torque movement between the cables is effectively overcome and tension is relieved from the cable splice in the event that axial pull occurs between the two cable ends. While this construction is not shown in FIGURE 3, it is evident that to incorporate the structure the outer sleeve 10 is of greater length than that shown in FIGURE 3.

We bond different parts together by electrically conductive tape such as illustrated in FIGURE 3 at 88 wherein the liner for the outer sleeve 10 is bonded to the clamp 31. The opposite cable clamp 30 may likewise be bonded to the liner if desired or necessary.

In FIGURE 5 we have shown an arrangement utilized for testing any leak within the inner sleeve 11, and particularly any leak which would adversely effect the cable splice. This arrangement differs somewhat from that shown in FIGURE 3 and in place of the fitting 26 a tube 100 communicates through a hole in the shoulder or flange 18 with the interior of the sleeve 11. This tube is adapted to communicate through a suitable grommet 101 with an air operated valve 102, the construction being such that the outer sleeve 10 carries adjacent one end thereof an external fitting 103 which is welded or otherwise secured to the sleeve. This fitting contains valve 102 and a coupling 104 is screw threaded to the fitting 103, the coupling securing a tube 105 for one end 106 of the tube while the opposite end is secured to cap type fitting members 107 and 108 between which is a grommet 109. Separate tubes at 110 and 111 communicate with the air valve 102 and flexible tubes 112 and 113 separately connect with the tubes 110 and 111. Preferably the flexible tubes 112 and 113 may be passed through flexible plastic tubes such as shown in FIGURES 1 and 2 at 114 and 115 with an elbow 116 connecting said tubes, the tube 115 leading to ground level, as shown in FIGURE 2 at 117. This construction is employed when the splice and its sleeves 10 and 11 are buried in the ground and so that the splice may be tested by air pressure from the surface of the ground without the necessity of digging into the ground to have access to the splice. The tubes 112 and 113 terminate in air valves of ordinary form such as used in pneumatic tires and here designated as 118. Thus, if a pressure test is to be made, air is pumped in by an ordinary automobile pump through one tube and into the inner sleeve through tube 100, the valve 102 is actuated and by placing a pressure gauge on the other pipe or tube 113, pressure within the sleeve may be determined. In other words, when air is forced down to open the valve, pressure is easily determined through the other tube by a suitable pressure gauge.

Figure 10:
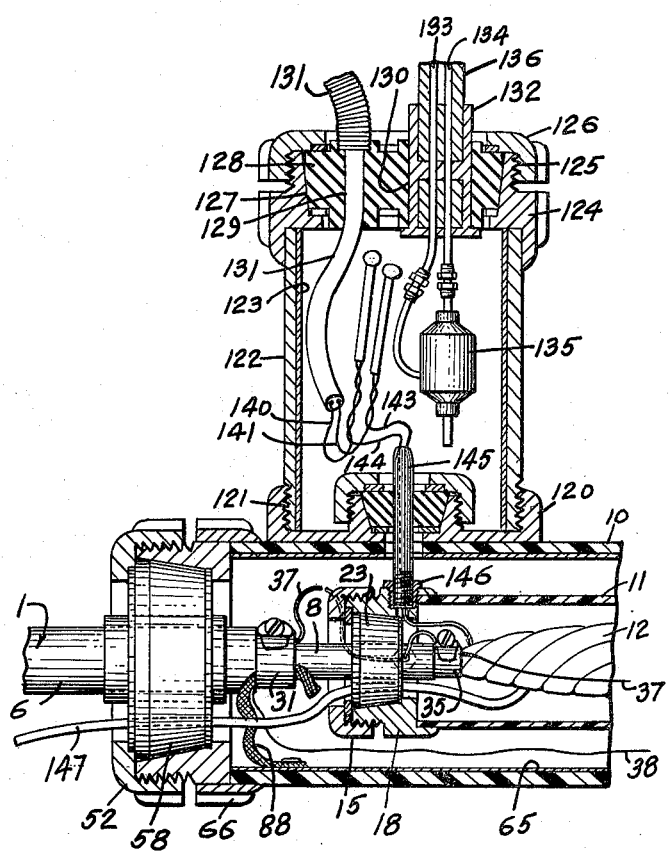
FIGURE 10 is a fragmentary sectional view, on an enlarged scale, taken substantially on the line 10—10 of FIGURE 9.

In FIGURES 9 and 10 we have shown a slightly different system for testing the splice 12 within the casing 11. We assume that the cable splice is buried in the ground, such as shown in FIGURE 2, and that the outer sleeve or casing 10 utilizes a more elaborate system for that of FIGURE 5 for giving an alarm in case of gas leakage from the inner sleeve or casing. The sleeve 10 is provided with an outer sleeve or housing adapted 120 which is internally screw threaded at 121 with the screw threaded end of an outer sleeve 122 secured to the threads 121, the outer sleeve 122 provided with an inner sleeve 123 preferably of metal, while the outer sleeve 122 may be of pipe type plastic. The opposite end of both outer and inner sleeves 122 and 123 are secured to a fitting 124. The fitting is externally screw threaded at 125 to receive an annular cap 126. The fitting 124 is provided with an inner tapered wall 127 within which is placed a grommet 128. The grommet is provided with transverse bores at 129 and 130, the bore 129 accommodating an insulation sheath 131 while the bore 130 accommodates a fitting 132 for air pressure tubes 133 and 134. The air pressure tubes enter the confines of the sleeve 123 and connect with a valve 135. The tubes 133 and 134 are encased within connected pipes 136 terminating in a box at the surface of the ground, as shown at 137. Both tubes 133 and 134 have ordinary tire type valves at ends thereof 138 and 139. The sheath 131 is armored and extends to the box 137 where wires 140 and 141 connect with a thermostat 142. The wires 140 and 141 join wires 143 and 144 which are passed through a tube or nipple 145 secured by means of a nut 146 to flange 18. This construction is followed instead of that shown in FIGURE 3 wherein a bent tube 26 is used. The wires 143 and 144 enter the splice 12 so that any failure in the splice will immediately and electrically actuate the thermostat 142 to give an alarm. This alarm may be at the position of the splice above the surface of the ground or may be at a central station with a pair of the cable wires within the splice used for this purpose. In FIGURE 10 the sheath and certain insulated wires from the splice as shown at 147 lead to a loading coil 148, if found necessary. The loading coil may be within the inner or outer sleeve, or at ground level.

The operation, uses and advantages of our invention are follows:

Primarily we have shown our invention as a protection means for cable splices situated below ground level. It does not necessarily follow that our invention cannot be used above the ground level as it is adaptable for such placement. As a rule, the main cables are buried in the ground a certain distance below ground level and the splices may be within an open or closed well and suitably supported. If the splice is unsupported, it is good practice to use a firm rock bed upon which the sleeves containing the splice may rest in order to relieve tension therefrom. We may provide testing means for determining loss of air pressure within the inner sleeve containing the splice. This testing means may be located at each splice with the testing means located above ground level. However, leak tests may be made at a central station by using certain of the cable wires in the splice for this purpose.

After a cable has been spliced, as shown in FIGURE 4, both the outer and inner sleeves 10 and 11 may be brought into position for connection with the caps and grommets for one end of each sleeve. Thus the cap and end grommets for one end of each sleeve would be carried on one cable 1 while the sleeves 10 and 11 would encircle the other cable 2 for slide movement over the splice when the splice is completed, as shown in FIGURE 3. If the splice is subjected to torque or longitudinal tension the device of FIGURE 7 is incorporated to combat these conditions.

The caps for the outer sleeve 10 compress the grommets around the cable sheaths and render communication within the sleeve 10 from outside the cable sheath fluid tight. The outer sleeve, by having a steel liner, is resistant to compressive stresses and the outer sleeve being formed of a pipe type plastic is resistant to corrosion while at the same time being dielectric. The inner sleeve 11 is spaced from the interior of the steel liner and by means of the grommets and end caps is both water and air tight so that the interior of sleeve 11 is at all times dry. Ground connections are effected between the cable sheaths, the steel liner through the wires and electrical tape, shown at 37, 38 and 88. The parts being grounded overcomes static effects. A gas under pressure is maintained within the inner sleeve 11 which may be air or nitrogen or other gas and the testing means will indicate pressure within the sleeve 11. Thus any defect in a cable splice or moisture seepage may be readily detected in a minimum of time.

We have found the invention easy to assemble with proven satisfaction in actual use and service. The outer sleeve construction is such as to resist compressive stresses and the sleeve under actual service conditions has been found to retain its integrity without breakage, a point of great importance where the invention is for missile use.

We claim:

1. A splice enclosure for cables having conductor portions leading to the splice, an insulating sleeve for enclosing the cable splice, means capping and sealing both ends of the sleeve and surrounding the conductor portions of the cable against entrance therein of a fluid, a second insulating sleeve spacedly surrounding the first named sleeve and having a steel liner to resist compression forces, means to ground said liner, each sleeve having an internal annular shoulder, means capping and sealing ends of the second sleeve and surrounding the conductor portions of the cable to maintain the space between the first named and the second named sleeves in fluidtight relation, each of said capping and sealing means including a cap having a down-turned flange and a grommet between two split washers, one of which engages the shoulder of the proximate sleeve and the other engages the downturned flange of the cap.

2. A splice enclosure for cables having conductor portions leading to the splices, including; an insulating sleeve for enclosing the cable splice, means capping and sealing both ends of the sleeve and of the conductor portions of the cable against entrance therein of a fluid, a second insulating sleeve spacedly surrounding the first named sleeve and means capping and sealing ends of the second sleeve and surrounding the conductor portions of the cable to maintain the space between the first named and second named sleeves in fluidtight relationship, each of said capping and sealing means including a cap and a grommet, means secured to the cable, external the first named sleeve for relieving torque and tensile stresses from the cable splice, said means including a diametrically arranged pair of looped straps connecting the cable ends and being clamped to each cable beyond the caps of the inner sleeve at a plurality of spaced points of different diameters.

3. An enclosure for spliced sheathed cables, each of which has a wire core surrounded by a rubber sheath, followed by alternate insulation and metallic sheaths, the innermost and outermost sheaths being of insulating material, a non-metallic inner insulating sleeve open at both ends for covering said cable splice, an outer insulating sleeve coaxial with and spaced about the inner sleeve, cap and grommet means for capping and sealing each end of the inner sleeve to maintain the interior of the sleeve fluidtight, metal strap means within the outer sleeve for engagement with the metallic cable sheaths for relieving tensile and torque stresses from the splice, a steel lining for the outer sleeve, and means for grounding said steel lining and the metallic sheaths.

4. The device of claim 3 in which the tensile and torque means are paralled metal straps secured to the cap closure of the inner sleeve and to spaced points on the cable ends.

5. The device of claim 4 with clamps of different diameters surrounding each cable end, in which the metal straps are looped with the inner side of each loop connected to said clamps of different diameters engaging the cable ends whereby to minimize relative torque movement between the cables and to relieve tension should an axial pull occur between the two cable ends.

6. The device of claim 5 in which corrugated shoes are positioned between each clamp and the cable end.

7. The device of claim 6 in which the cables are covered, respectively, with the insulation around the wires, a corrugated aluminum shield, insulation, armored tape and an outer sheath and the shoes engage respectively from the splice, the shield at one end of the splice, the armored tape, and the outer sheath over the armored tape.

References Cited by the Examiner
UNITED STATES PATENTS

| | | | |
|---|---|---|---|
| 2,392,748 | 1/46 | Lee | 174—22 |
| 2,520,624 | 8/50 | Davey | 174—11 |
| 2,771,502 | 11/56 | King et al. | 174—92 |
| 2,930,835 | 3/60 | Bollmeier | 174—92 X |
| 2,996,567 | 8/61 | Channell et al. | 174—92 |

FOREIGN PATENTS 633,847  12/49  Great Britain.

JOHN F. BURNS, *Primary Examiner.*

JOHN P. WILDMAN, *Examiner.*